(12) United States Patent
Hsu et al.

(10) Patent No.: US 10,234,548 B2
(45) Date of Patent: Mar. 19, 2019

(54) ULTRASONIC DETECTION DEVICE TO DETERMINE INTERFERENCE SOURCE BY AN ADDITIONAL RECEPTION MODE

(71) Applicant: Magna Electronics Solutions GmbH, Wetzlar (DE)

(72) Inventors: Chen-Yi Hsu, New Taipei (TW); Chien-Wen Lai, Zhubei (TW)

(73) Assignee: MAGNA ELECTRONICS SOLUTIONS GMBH, Wetzlar (DE)

( * ) Notice: Subject to any disclaimer, the term of this patent is extended or adjusted under 35 U.S.C. 154(b) by 349 days.

(21) Appl. No.: 14/711,221

(22) Filed: May 13, 2015

(65) Prior Publication Data

US 2015/0331100 A1   Nov. 19, 2015

(30) Foreign Application Priority Data

May 14, 2014 (CN) .......................... 2014 1 0203148

(51) Int. Cl.
*G01S 7/527* (2006.01)
*G01S 15/04* (2006.01)
(Continued)

(52) U.S. Cl.
CPC .......... *G01S 7/527* (2013.01); *G01S 7/52004* (2013.01); *G01S 7/539* (2013.01); *G01S 15/04* (2013.01); *G01S 15/10* (2013.01); *G01S 15/931* (2013.01)

(58) Field of Classification Search
CPC .. G01S 7/52004; G01S 7/5209; G01S 7/5273; G01S 15/04; G01S 15/06;
(Continued)

(56) References Cited

U.S. PATENT DOCUMENTS 4,197,539 A * 4/1980 Suzuki ................. G01S 7/2806
342/159
5,313,072 A   5/1994 Vachss
(Continued)

FOREIGN PATENT DOCUMENTS

CN       101169479 A  *  4/2008  ............... G01S 7/52
CN       105093228 A      11/2015
(Continued)

*Primary Examiner* — Lisa M Caputo
*Assistant Examiner* — Suman K Nath
(74) *Attorney, Agent, or Firm* — Honigman LLP

(57) ABSTRACT

The present invention is directed to an ultrasonic detection device and detection method thereof. The ultrasonic detection device includes a processor and a transceiver module, whereby the transceiver module may be operated to enter an additional reception mode and receive a first ambient echo. The processor may analyze the first ambient echo and generate an analysis result. When the generated analysis result shows that the first ambient echo has a signal characteristic indicative of an interference source in the environment, the transceiver module may again enter the additional reception mode before a detection operation is performed. As a result, an elimination mode may be performed to correctly obtain or distinguish the corresponding reflected wave of the detection operation, thereby avoiding an error of operation, such as distance detection, due to the presence of an interference source.

13 Claims, 5 Drawing Sheets

(51) Int. Cl.
*G01S 7/539* (2006.01)
*G01S 15/10* (2006.01)
*G01S 7/52* (2006.01)
*G01S 15/93* (2006.01)

(58) Field of Classification Search
CPC .............. G01S 15/931; G01N 29/4409; G01N 29/4436; G01N 29/4463
USPC .......... 73/598, 602, 627; 367/93, 95, 96, 98, 367/99, 100, 135, 136, 137; 180/167, 180/168, 169
See application file for complete search history.

(56) References Cited

U.S. PATENT DOCUMENTS

| | | | |
|---|---|---|---|
| 5,426,294 A | 6/1995 | Kobayashi et al. | |
| 5,670,935 A | 9/1997 | Schofield et al. | |
| 5,796,094 A | 8/1998 | Schofield et al. | |
| 5,877,897 A | 3/1999 | Schofield et al. | |
| 6,313,454 B1 | 11/2001 | Bos et al. | |
| 6,396,397 B1 | 5/2002 | Bos et al. | |
| 6,824,281 B2 | 11/2004 | Schofield et al. | |
| 7,038,577 B2 | 5/2006 | Pawlicki et al. | |
| 7,557,692 B2 * | 7/2009 | Li | G01S 15/878 340/435 |
| 7,972,045 B2 | 7/2011 | Schofield | |
| 8,013,780 B2 | 9/2011 | Lynam | |
| 9,036,026 B2 | 5/2015 | Dellantoni et al. | |
| 9,126,525 B2 | 9/2015 | Lynam et al. | |
| 9,264,673 B2 | 2/2016 | Chundrlik, Jr. et al. | |
| 2007/0103281 A1 * | 5/2007 | Li | B60T 13/24 340/435 |
| 2010/0067324 A1 * | 3/2010 | Preissler | G01S 7/52004 367/13 |
| 2011/0122728 A1 * | 5/2011 | Liao | G01S 15/003 367/95 |
| 2013/0278769 A1 | 10/2013 | Nix et al. | |
| 2013/0314503 A1 | 11/2013 | Nix et al. | |
| 2014/0049646 A1 | 2/2014 | Nix | |
| 2015/0323504 A1 | 11/2015 | Wei et al. | |

FOREIGN PATENT DOCUMENTS

| | | | |
|---|---|---|---|
| DE | 102015208561 A1 | 11/2015 | |
| TW | 200817212 A * | 4/2008 | ............. B60Q 11/00 |

* cited by examiner

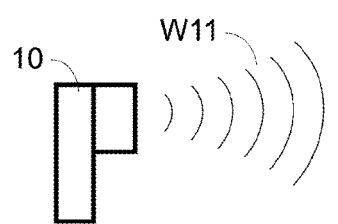
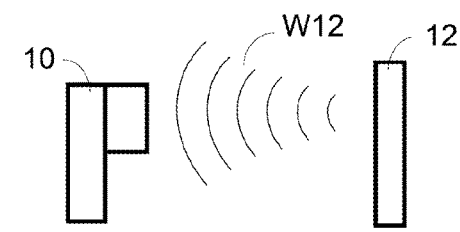
FIG. 1A          FIG. 1B
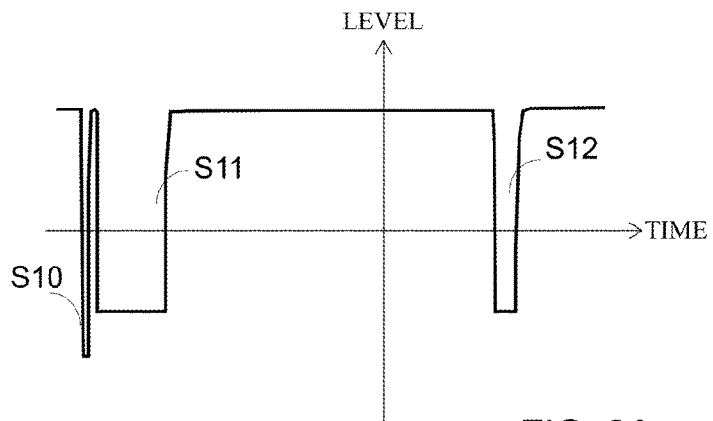
FIG. 2A
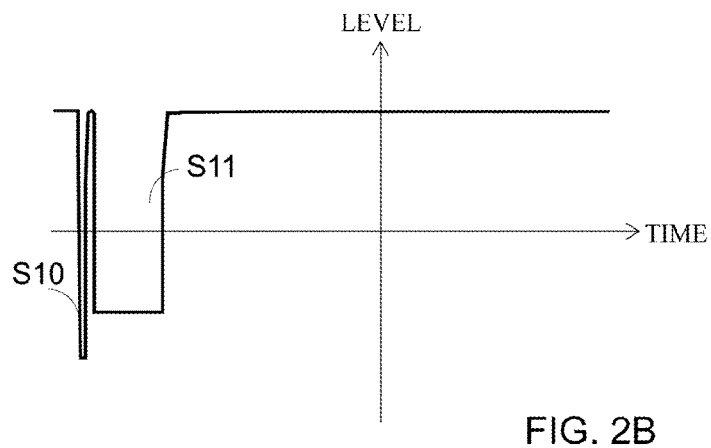
FIG. 2B

ULTRASONIC DETECTION DEVICE TO DETERMINE INTERFERENCE SOURCE BY AN ADDITIONAL RECEPTION MODE

CROSS-REFERENCE TO RELATED APPLICATION

The present application claims the benefit of Chinese Patent Application No. 201410203148.5, filed on May 14, 2014 in the State Intellectual Property Office of China, the disclosure of which is incorporated herein by reference in its entirety.

FIELD OF THE INVENTION

The present invention is related to an ultrasonic detection device and detection method thereof, and particularly, to a detection device and detection method thereof that determines, by an additional reception mode, whether there is an interference source in the surrounding environment and performs a corresponding elimination process, so as to correctly complete a detection operation.

BACKGROUND OF THE INVENTION

It is generally known that radar or ultrasonic detection techniques may be used with a variety of applications, for example, with a reversing radar, with a motion-sensing lighting device, or with other monitoring devices. Such known detection techniques use a device to generate a vibration with a specific frequency and transmit an ultrasonic wave to perform a detection. The ultrasonic wave may arrive at a corresponding target object, reflect off the target object, and the reflected wave may be received by the device, such that the elapsed time from transmitting to receiving the ultrasonic wave may be known as a Time of Flight (abbreviated as TOF). The TOF may thereby be used to calculate a distance from the device generating the ultrasonic wave to the target object. As such, it is possible to perform a detection and make a determination in various environments for related applications.

With reference to the schematic diagrams shown in FIGS. 1A and 1B, a known ultrasonic detection device 10 is illustrated that operates in a detection wave transmission mode and in a reflected wave reception mode, respectively. As shown, the ultrasonic detection device 10 can simultaneously have functions of transmitting an ultrasonic wave and receiving its reflected wave. Accordingly, the device 10 includes a transceiver module (or antenna), which is constituted by a transmitter and a receiver, and the transmitter and receiver can carry out a detection operation in the same direction or toward the same target object 12.

Specifically, the ultrasonic detection device 10 may transmit an ultrasonic wave (detection wave) W11 in the transmission mode and then switch to the reception mode, so as to receive the reflected wave W12 from the target object 12 or another obstacle appearing in front of the device, based on the situation of the reflection received. Therefore, performing a single detection comprises transmitting a detection wave once, switching to a reception mode, and receiving a reflected wave once. Commonly, an ultrasonic detection device may be provided with one or more transceiver modules. If a device has multiple transceiver modules, it is possible for the respective transceiver modules to alternate functions, thereby performing a detection in turn. If a device has only one transceiver module, a mode switch must be performed immediately after a transmission mode so as to carry out a reception.

With reference to FIGS. 2A and 2B, schematic diagrams are provided that illustrate signals that vary over time in situations where there is an obstacle in front of the device (FIG. 2A) and where there is no obstacle in front of the device (FIG. 2B). In the figures, a horizontal axis represents the time and a vertical axis represents a signal level (in volts). As shown, the ultrasonic detection device 10 may first generate an instruction signal S10 to start a detection operation and then generate an oscillating signal S11, which thereby transmits the ultrasonic wave (detection wave) W11, as mentioned above. If an obstacle is located in front of the device, an echo signal S12 (as shown in FIG. 2A) represented by the reflected wave W12 will be received, and if no obstacle is located in front of the device, no echo signal (as shown in FIG. 2B) will be generated.

In this process discussed with reference to FIGS. 1A-2B, a time interval during which the oscillating signal S11 is generated is a type of ringing time, that is, the elapsed time that a piezoelectric patch in the transceiver module gradually turns into a stationary state after generating an ultrasonic wave in the manner of vibration. However, in a practical operation, the ultrasonic detection device 10 may often cause a detection error due to an affection from an external correlated interference source. For example, as shown in FIG. 3A, a schematic diagram illustrates an ultrasonic detection device 10 performing another detection operation with respect to a target object 12, but an interference source 13 is present in the environment (such as a siren, a horn, and other kinds of sounding sources). Thus, in the case of the detection of the detection wave W11, besides the corresponding reflected wave W12 as shown in FIG. 1B, the ultrasonic detection device 10 may also receive a clutter wave W13 emitted from the interference source 13, so making it difficult to correctly determine which one is the reflected wave caused by the target object 12.

Further, with reference to FIG. 3B, a schematic diagram shows a signal that varies with time where other interference sources are located in front of the device. As shown in FIG. 3B, the clutter signal S13 caused by the clutter wave W13 or other interference sources appears the same as an echo signal, making it is impossible for the ultrasonic detection device 10 to distinguish which one represents the reflected wave formed by the target object 12 or which one represents the noise caused by the interference sources, and moreover, making it is difficult to determine the accurate reception time, which influences the corresponding distance calculation.

SUMMARY OF THE INVENTION

An object of the present invention is to provide an ultrasonic detection device and detection method thereof. The detection device and detection method thereof determines, by an additional reception mode, whether there is an interference source in an environment and performs a corresponding elimination process, so as to correctly complete a detection operation.

According to one aspect of the present invention, an ultrasonic detection method is applied to an ultrasonic detection device that includes a processor and a transceiver module. The method includes the steps of causing the transceiver module to enter an additional reception mode and receive a first ambient echo. The processor analyzes the first ambient echo and generates an analysis result that shows that the first ambient echo has a signal characteristic. The signal characteristic causes the transceiver module to again enter the additional reception mode before a detection operation is performed.

According to another aspect of the present invention, an ultrasonic detection method is applied to an ultrasonic detection device that includes a processor and a transceiver module, the method comprising steps of causing the transceiver module to enter a preset transmission mode of a detection operation and transmit a first detection wave. The method also includes causing the transceiver module to enter a preset reception mode of the detection operation and receive a first ambient echo, which causes the transceiver module to enter an additional reception mode and receive a second ambient echo. The processor analyzes the second ambient echo and generates an analysis result, which shows that the second ambient echo has a signal characteristic. The method also includes performing, by the processor, an elimination process on the first ambient echo.

According to another aspect of the present invention, an ultrasonic detection device includes a transceiver module configured to receive a first ambient echo in an additional reception mode. The ultrasonic detection device also includes a processor configured to analyze the first ambient echo and generate an analysis result. When the analysis result shows that the first ambient echo has a signal characteristic, the processor is configured to cause the transceiver module to again enter the additional reception mode before a detection operation.

According to yet another aspect of the present invention, an ultrasonic detection device includes a transceiver module configured to transmit a first detection wave in a preset transmission mode of a detection operation and to receive a first ambient echo in a preset reception mode of the detection operation. The transceiver module is further configured to receive a second ambient echo in an additional reception mode. A processor is configured to analyze the second ambient echo and generate an analysis result. When the analysis result shows that the second ambient echo has a signal characteristic, the processor is configured to perform an elimination process on the first ambient echo.

In order to better understand the above and other aspects of the present invention, hereinafter, embodiments will be illustrated and detailed descriptions will be provided below in conjunction with the drawings attached thereto.

BRIEF DESCRIPTION OF THE DRAWINGS

FIGS. 1A and 1B are schematic diagrams of a known detection device that runs in a detection wave transmission mode and a reflected wave reception mode, respectively;

FIGS. 2A and 2B are schematic diagrams of signals that vary with time in the case that there is an obstacle in front of the device and in the case that there is no obstacle in front of the device, respectively;

DETAILED DESCRIPTION OF THE EMBODIMENTS

Figure 3A:
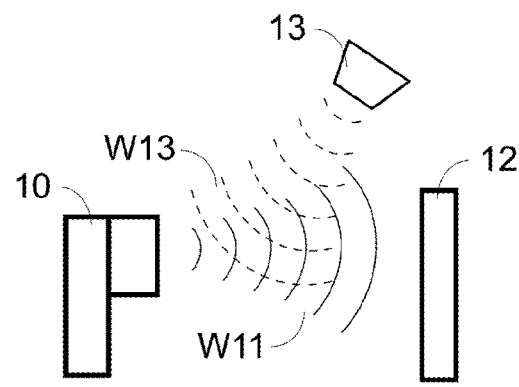
FIG. 3A is a schematic diagram of an ultrasonic detection device that carries out another detection operation.
Figure 3B:
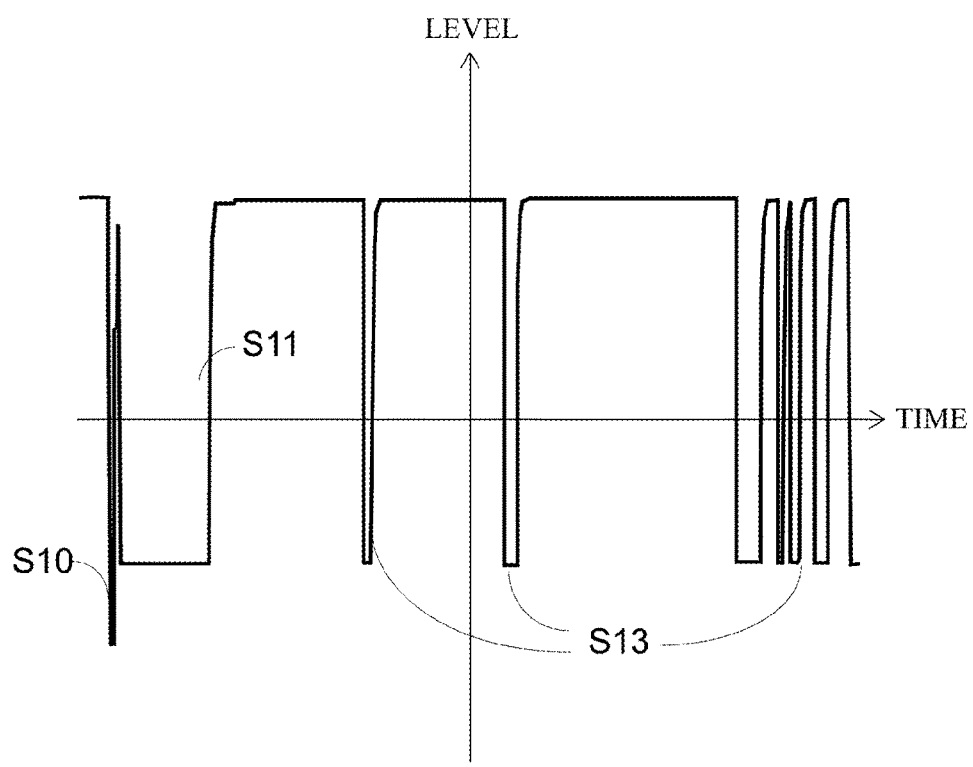
FIG. 3B is a schematic diagram of a signal that varies with time in the case that there are a plurality of obstacles in front of the device.
Figure 4:
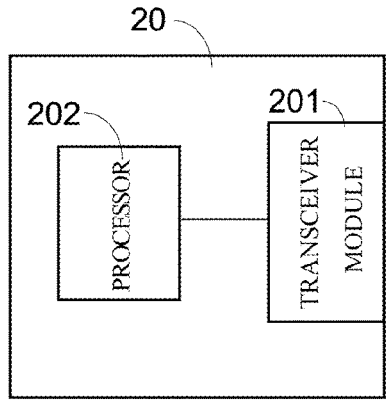
FIG. 4 is a functional block diagram of an ultrasonic detection device of the present invention.

Referring now to the drawings and the illustrative embodiments depicted therein, an ultrasonic detection device is implemented with a detection method that determines, by an additional reception mode, whether there is an interference source and performs a corresponding elimination process, so as to correctly complete a detection operation. As shown in FIG. 4, a functional block diagram of an ultrasonic detection device 20 is depicted in accordance with the present invention. The ultrasonic detection device 20, as shown, mainly comprises a processor 202 and a transceiver module 201. The transceiver module 201 of the present invention simultaneously has functions of transmitting an ultrasonic wave and receiving a corresponding reflected wave. For example, the functions of transmitting (Tx) and receiving (Rx) may be performed by the same antenna or two or more antennas designed to separately transmit (Tx) and receive (Rx) in the same general direction in such a transceiver module 201. The transceiver module 201 can be electrically connected to the processor 202 and can transmit a corresponding detection wave (ultrasonic wave) under control of the processor 202, such that the processor 202 may inspect and determine the reflected wave.

The ultrasonic detection device 20 may also include additional elements, such as a driver, a signal amplifier, a comparator, and other elements, as generally understood by one having ordinary skill in the art. In addition, the ultrasonic detection method of the present invention can be provided in the ultrasonic detection device 20 in the manner of an associated circuit or firmware, so that it can perform a specified operation. As for other hardware settings or constituent elements, they may be the same or similar to those of a known ultrasonic detection device, such that the present invention can achieve various operational purposes.

To determine whether the ultrasonic detection device is in an interference environment, one embodiment of the present invention includes a checking mechanism of an additional reception mode that is performed during the process of carrying out the detection operation or before the start of the operation. Typically, carrying out a detection in a single instance involves transmitting the detection wave (ultrasonic wave) once and switching to a corresponding reception mode once, and if the device has only one transceiver module, it must switch to the reception mode immediately after the transmission mode. The additional reception mode of the present invention provides a pure reception mode without carrying out a corresponding transmission mode, through which it may be possible to determine whether a clutter wave or an interference exists in the environment.

Figure 7A:
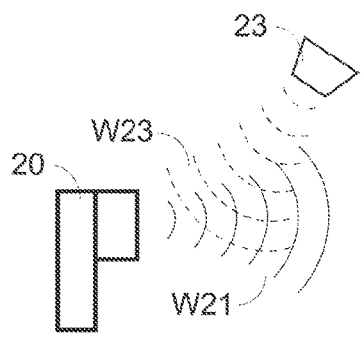
FIGS. 7A and 7B are schematic diagrams of an the ultrasonic detection device that runs in a transmission mode and in a reception mode, respectively.
Figure 7B:
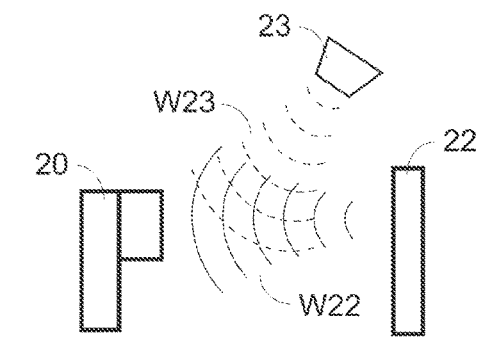

Further, one embodiment of the invention may operate the ultrasonic detection device 20 to determine if the detection is being performed in an environment with an interference source 23, as shown in FIG. 7A, or determine whether an interference source 23 is present in the environment that could affect a detection. In general, such an interference source 23 (e.g., a siren, a horn, etc.) still can actively or randomly generate a cluster wave W23 (FIGS. 7A and 7B), even in the case that the transceiver module 201 does not transmit a detection wave. The interference source 23, as shown in FIGS. 7A and 7B, is a single, exemplary interference source, but it is contemplated that the present invention may operate on multiple and different types of interference sources.

Figure 5:
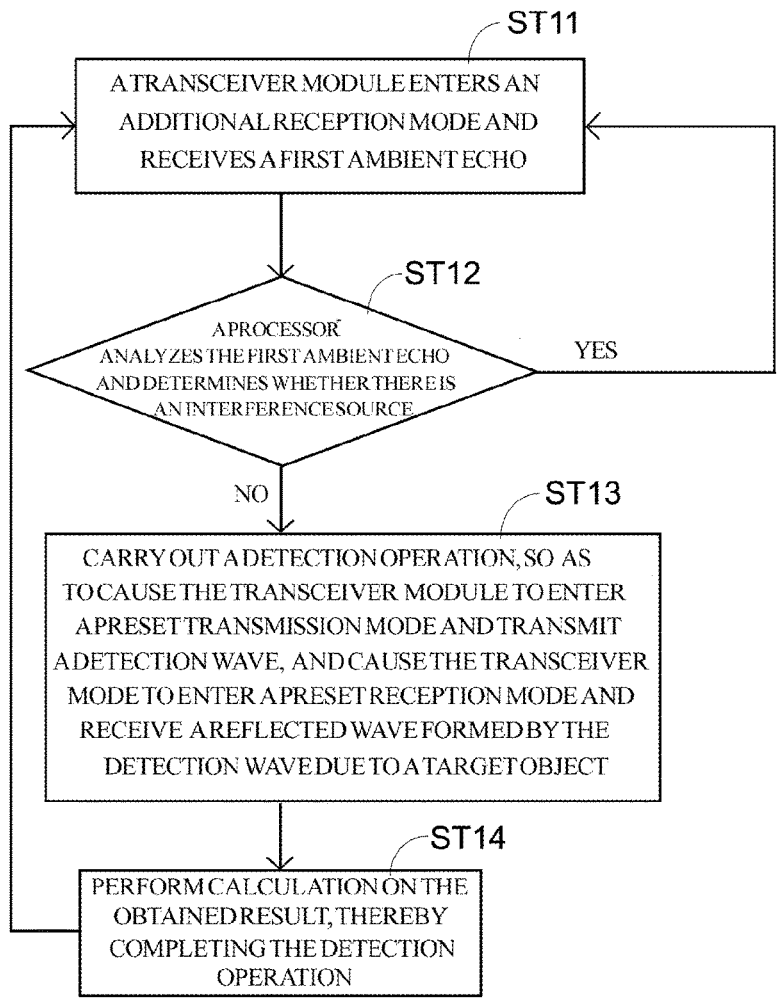
FIG. 5 is a flowchart of implementation of a first embodiment of the present invention.

In one embodiment of the additional reception mode of the present application, it is possible to initially find existence of the shown interference source, before performing the detection. In this embodiment, the additional reception mode is carried out to identify potential interference sources 23 before the detection operation runs, that is, the transceiver module 201 does not transmit a corresponding detection wave until the additional reception mode is completed. As shown in FIG. 5, firstly, the transceiver module 201 is caused to enter an additional reception mode and receive a first ambient echo (step ST11). The first ambient echo is likely a pure ambient state in the case of transmitting no corresponding detection wave. Next, the processor 202 analyzes the first ambient echo and generates an analysis result, so as to determine whether there is an interference source (step ST12).

Figure 6A:
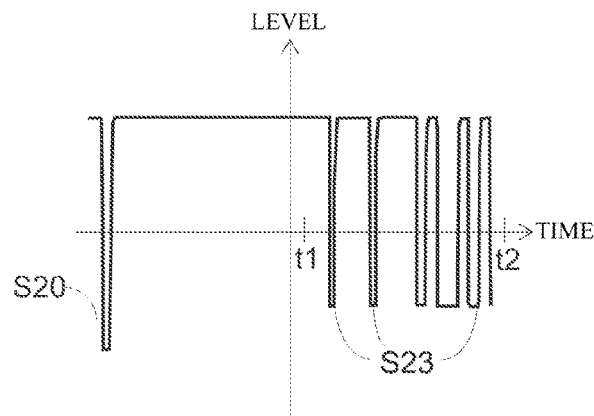
FIGS. 6A and 6B are schematic diagrams of signals vary with time in the case that there is an interference source in front of the device and in the case that there is no interference source in front of the device in an additional reception mode, respectively.
Figure 6B:
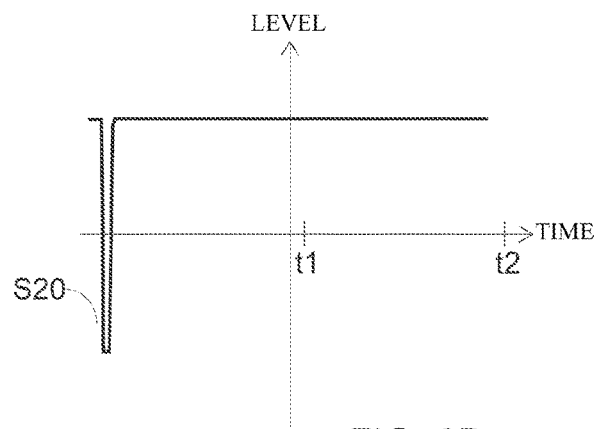

To reiterate the process described with reference to FIG. 5 in greater detail, the processor 202 may first generate an instruction signal S20 (as shown in FIG. 6A or 6B) to cause the transceiver module 201 to enter the additional reception mode to be able to start receiving any external echoes. Then, the processor 202 may perform the corresponding analysis and determination within a preset time range, such as between time point t1 to time point t2, as shown in FIGS. 6A and 6B. That is to say, if it is found within this preset time range that there is an echo that reaches a preset standard or otherwise exceeds a predetermined threshold, it may be determined that there is an interference source. However, if no echo is found to reach the preset standard or otherwise exceed the predetermined threshold when this preset time range is exceeded, it may be determined that there is no readily identifiable interference source. Time point t1 to time point t2 may be practically set as required by operational needs, but it should be avoided that it is set as extremely long or short, so as not to wait too long or to detect incorrectly.

Analyzing the relationship between any received external signals (or a determination) and the preset standard may be referred to as analyzing whether the first ambient echo has a signal characteristic. In this embodiment, the signal characteristic refers to the signal frequency being greater than a frequency threshold. Because common interference sources, like a siren or a horn, mainly show a high-frequency characteristic, the additional reception mode may be set for a high-frequency signal in the echo to be determined as an interference source. If there is an interference source 23 (as shown in FIG. 7A) in the environment, the transceiver module 201 may receive one or more clutter signals S23 (as shown in FIG. 6A) represented by the clutter wave W23, and when there is no interference source in the environment, there is no echo at all (as shown in FIG. 6B).

Next, another feature in this embodiment is provided in that when the analysis result shows that the first ambient echo has the signal characteristic, the processor 202 may determine that the device is in an environment with an interference, and may further cause the device to again enter the additional reception mode before the device carries out a detection operation (step ST11). Because existence of the interference source in the environment is already known at this stage, it is unlikely to obtain a correct detection result if the detection operation continues alone. In addition, in another embodiment, the number of times of again entering step ST11 from step ST12 is determined, and when the number of times exceeds a set value, a system predetermined value is output directly.

The detection operation refers to a generally-known distance detection, or the actions like switching between a preset transmission mode and a preset reception mode, receiving and transmitting signals. As shown in FIGS. 7A and 7B, the detection operation includes causing the transceiver module 201 to enter the preset transmission mode and transmit a detection wave W21, and causing the transceiver module 201 to enter the preset reception mode and receive a reflected wave W22 formed by the detection wave W21 due to a target object 22.

As a continuation, when there is an interference source 23 in the environment, the device will not be able to distinguish the clutter wave W23 and the reflected wave W22. In this embodiment, the processor 202 causes the transceiver module 201 to again enter the additional reception mode, that is, repeatedly again receiving the first ambient echo that represents the ambient state in the case of transmitting no detection wave. In other words, this embodiment again carries out a detection operation when the clutter wave W23 is not present or in the case that there is no interference source 23. As such, it is possible to obtain the required reflected wave correctly.

Therefore, when the analysis result shows that the first ambient echo does not have the signal characteristic, i.e., the interference source 23 shown in FIGS. 7A and 7B does not exist (or it exists but has no influence), the processor 202 determines that the device is not in an environment with an interference, and causes the transceiver module 201 to carry out the detection operation, that is, transmitting the detection wave W21 and receiving the echo W22 (step ST13). Because it is already known at this stage that there is no interference source in the environment, the obtained echo can represent the required reflected wave.

Further calculation can be performed on the obtained result, that is, the processor 202 can calculate a Time of Flight between the detection wave W21 and the reflected wave W22, so as to obtain a detection distance between the ultrasonic detection device 20 and the target object 22, thereby completing the detection operation (step ST14). In addition, the above-described flow of implementation of the embodiment may be repeated.

In this embodiment, although the time point of receiving the reflected wave which is regarded as the required reflected wave is later than the time point of determining that there is no interference source in the environment, due to rapid processing performance of the device, the two time points can be very close. In other words, this embodiment uses the time point of determining there is no interference source in the environment to effectively predict the subsequent detection operation will not be affected by an interference source, so as to effectively obtain the echo without any interference.

Referring now to a second embodiment of implementing the ultrasonic detection device and the detection method of the present invention. The second embodiment differs from the above first embodiment only in the order of performing the detection operation and the additional reception mode; otherwise, the other techniques, including element settings, further analyzing, determining, and calculating are the same as those in the first embodiment. To be specific, in the second embodiment, description is provided with the additional reception mode being carried out after the detection operation begins, that is, the transceiver module 201 has already completed the reception of the corresponding reflected wave.

Similar to the first embodiment, in the second embodiment the ultrasonic detection device 20 is located within an environment with an interference source 23 as shown in FIGS. 7A and 7B. However, in this embodiment, the detection wave W21 and the reflected wave W22 may represent a cycled detection operation situation.

Figure 8:
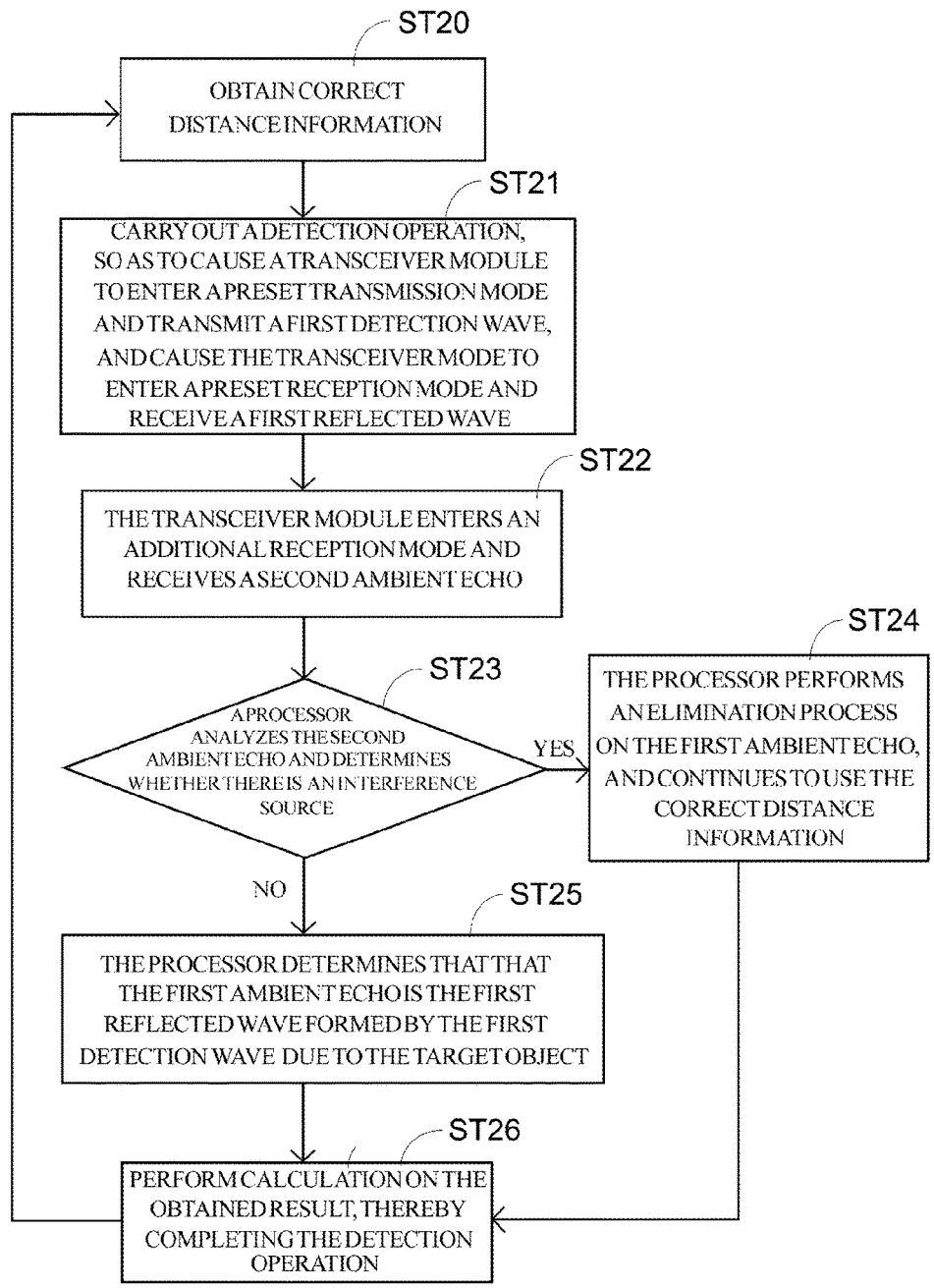
FIG. 8 is a flowchart of implementation of a second embodiment of the present invention.

With reference to FIG. 8, which is a flowchart of implementation of the second embodiment of the present invention, correct distance information is first obtained, for example, in the manner as shown in FIG. 5, i.e., calculating the correct distance information in the case of no interference source in the environment, and recording the same. Next, at step ST21, the transceiver module 201 is caused to enter a preset transmission mode and transmit a first detection wave, and the transceiver module 201 is caused to enter a preset reception mode and receive a first ambient echo. Therefore, besides the corresponding first reflected wave formed by the first detection wave due to the target object 22, probably, the first ambient echo at this stage may also include the clutter wave W23.

With further reference to FIG. 8, at step ST22, the transceiver module 201 is caused to enter an additional reception mode and receive a second ambient echo. The second ambient wave in this embedment may be a pure ambient state in the case of transmitting no corresponding detection wave. Subsequently, at step ST23, the processor 202 analyzes the second ambient echo and generates an analysis result, so as to determine whether there is an interference source. When the analysis result shows that the second ambient echo has the signal characteristic, the processor 202 determines that the device is in an environment with an interference, and performs an elimination process on the first ambient echo at step ST24.

In other words, this embodiment can record the correct distance information that is obtained previously and the first ambient echo. If the subsequent additional reception mode determines that there is an interference source in the environment, then an elimination process is performed on the first ambient echo. In this embodiment, the elimination process is to directly discard the first ambient echo, and directly continue to use the correct distance information recorded previously. In another embodiment, it is to discard the first ambient echo, not continue to use the correct distance information recorded previously, but to continue to detect whether there is an interference source in the environment, i.e., returning to step ST22, when it is determined that there is no interference source, to carry out a detection operation to obtain a correct detection result.

Similarly, although in this stage the time point of the first reflected wave which is used continuously and regarded as the required first reflected wave is earlier than the time point of determining that there is no interference source in the environment, due to rapid processing performance of the device, the two time points can be very close. In other words, this embodiment can use the echo received when determining there is no interference source in the environment to effectively predict the reflected wave when there is no interference source. As such, it is also possible to obtain the required reflected wave correctly.

When the analysis result shows that the second ambient echo does not have the signal characteristic, i.e., the interference source 23 in FIGS. 7A and 7B does not exist (or it exists but has no influence), at step ST25, the processor 202 determines that the device is not in an environment with an interference and directly determines that the first ambient echo is the first reflected wave formed by the first detection wave due to the target object; that is, the first ambient echo is regarded as the required reflected wave.

It is contemplated that further calculation can be performed on the obtained result. More specifically, at this time, the processor 202 may calculates a Time of Flight between the first detection wave and the first reflected wave, so as to obtain a detection distance between the ultrasonic detection device 20 and the target object 22, thereby completing the detection operation, at step ST26. After completion of the detection operation, the detected distance may be recorded, and this detected distance may then be set as the correct distance information, as reference at step ST20. In the process of the next detection, if it is determined that there is an interference source, the updated correct distance information is output, and when it is determined that there is no interference source, the correct distance information is recorded and updated. In addition, the above implementation flow (steps ST20 to ST26) may be repeated.

In another embodiment, when it is determined in step ST23 that there is an interference source in the environment, the ambient echo with an interference is eliminated via step ST24, entering step ST22 again. The number of times of again entering step ST22 from step ST23 may be counted and therefore determined. When the number of times exceeds a predetermined value, the correct distance information recorded previously may be output.

The present invention can effectively achieve the aim of determining whether there is an interference source in the environment by means of the provided additional reception mode, and further adopt the corresponding elimination mode to correctly obtain or distinguish the corresponding reflected wave of the detection operation, thereby avoiding an error of operation, such as the distance detection. Therefore, the present invention can effectively solve the related technical problem raised in the prior art, and successfully achieve the primary object for which the present invention is developed.

Although the present invention has already been disclosed as above in the described embodiments, these embodiments are not intended to limit the present invention. Those skilled in the art can make various modifications and variations without departing from the spirit and scope of the present invention. Accordingly, the protection scope of the present invention is based on what is claimed in the claims attached.

What is claimed is:

1. An ultrasonic detection method for an ultrasonic detection device that includes a processor and a transceiver module operable in a plurality of reception modes, the method comprising:

generating via the processor a first instruction signal to cause the transceiver module of the ultrasonic detection device to enter a first reception mode that is operable to receive external signals from an environment monitored by the ultrasonic detection device, wherein the transceiver module is operable in the first reception mode for a preset time and without transmitting a detection wave, wherein the external signals comprise interference signals and reflections of detection waves transmitted by the transceiver and reflected off objects in the environment;

receiving a first external signal from the environment with the transceiver module in the first reception mode;

in response to the transceiver module receiving the first external signal from the environment monitored by the ultrasonic detection device while in the first reception mode, analyzing, by the processor, the first external signal based on whether the first external signal has a frequency that is greater than or equal to a threshold indicative of an interference source separate from the ultrasonic detection device;

determining, by the processor, whether the interference source is present based on the processor's analysis of the first external signal;

in response to the analysis indicating that the first external signal has a frequency that is greater than the threshold indicative of the interference source separate from the ultrasonic detection device, generating via the processor, a second instruction signal to cause the transceiver module to again enter the first reception mode;

in response to (i) the preset time of the transceiver module operating in the first reception mode elapsing and (ii) the transceiver module not receiving any external signals or the analysis indicating that the first external signal has a frequency that is less or equal to than a threshold indicative of the interference source not being present, generating via the processor a third instruction signal to cause the transceiver module to run a detection operation;

wherein the detection operation causes the transceiver module of the ultrasonic detection device to switch between a transmission mode and a second reception mode;

wherein the transmission mode transmits a detection wave and wherein the second reception mode receives a second external signal; and calculating, by the processor, a Time of Flight between transmission of the detection wave and reception of the second external signal, so as to obtain a detection distance between the ultrasonic detection device and a target object in the environment.

2. An ultrasonic detection method for an ultrasonic detection device with a processor and a transceiver module operable in a plurality of reception modes for receiving external signals from an environment monitored by the ultrasonic detection device, the method comprising:

transmitting a detection wave into the environment from the transceiver module in a preset transmission mode;

switching the transceiver module from the preset transmission mode to a preset reception mode for receiving external signals, wherein the external signals comprise interference signals and reflections of detection waves transmitted from the transceiver in the preset transmission mode and reflected off objects in the environment;

receiving a first external signal from the environment with the transceiver module in the preset reception mode;

receiving a second external signal from the environment with the transceiver module in an additional reception mode;

analyzing the second external signal with the processor based on whether the second external signal has a signal characteristic indicative of an interference source separate from the ultrasonic detection device;

determining whether the interference source is present based on the processor's analysis of the second external signal;

in response to the analysis of the second external signal indicating that the second external signal has a signal characteristic indicative of the interference source in the environment that is separate from the ultrasonic detection device, performing an elimination process on the first external signal with the processor of the ultrasonic detection device; and in response to the analysis indicating that the interference source is not present in the environment, calculating, with the processor, a Time of Flight between the transmission of the detection wave and the reception of the first external signal so as to obtain a detection distance between the ultrasonic detection device and a target object in the environment.

3. The ultrasonic detection method of claim 2, wherein the elimination process comprises discarding the first external signal and outputting a distance that was previously calculated by the processor when the interference source was not present.

4. The ultrasonic detection method of claim 2, further comprising:

determining, with the processor, that the received first external signal is a reflection of the transmitted detection wave when the analysis shows that the second external signal does not have the signal characteristic.

5. The ultrasonic detection method of claim 4, in response to calculating the detection distance, recording and updating a stored distance with the detection distance, wherein the elimination process comprises discarding the first external signal and outputting the stored distance.

6. An ultrasonic detection device, comprising:

a transceiver module configured to transmit a detection wave into a surrounding environment in a transmission mode and receive external signals from the surrounding environment in a plurality of reception modes, wherein the external signals comprise interference signals and reflections of detection waves transmitted by the transceiver and reflected off objects in the environment;

a processor configured to cause the transceiver module to enter a first reception mode without being in the transmission mode for a preset time;

wherein, responsive to the transceiver module receiving a first external signal in the first reception mode during the preset time, the processor analyzes the first external signal based on whether the first external signal has a signal characteristic indicative of an interference source separate from the ultrasonic detection device;

wherein, responsive to the analysis, the processor determines whether an interference source is present;

wherein, responsive to the analysis indicating that the first external signal has a signal characteristic indicative of the interference source separate from the ultrasonic detection device, the processor causes the transceiver module to again enter the first reception mode without being in the transmission mode for a preset time; and wherein, responsive to the analysis indicating that the first external signal does not have the interference source present and the preset time being elapsed, the processor causes the transceiver module to switch between the transmission mode and a second reception mode for receiving external signals.

7. The ultrasonic detection device of claim 6, wherein the signal characteristic includes a signal frequency of the first external signal being greater than a frequency threshold.

8. The ultrasonic detection device of claim 6, wherein the processor is configured to calculate a Time of Flight between the transmission of the detection wave and the reception of the external signals so as to obtain a detection distance between the ultrasonic detection device and a target object in the environment.

9. The ultrasonic detection device of claim 6, wherein the transceiver module does not transmit a detection wave when in the plurality of reception modes.

10. The ultrasonic detection device of claim 6, wherein the processor determines a detection distance between the ultrasonic detection device and a target object in response to the interference source not being detected by the transceiver module of the ultrasonic detection device in the first reception mode.

11. The ultrasonic detection device of claim 6, wherein, responsive to the analysis indicating that the received first external signal has a signal characteristic indicative of the interference source separate from the ultrasonic detection device, the processor outputs a previously recorded distance.

12. The ultrasonic detection device of claim 6, wherein the processor is configured to calculate a Time of Flight between the transmission of the detection wave and the reception of the external signals so as to obtain a detection distance between the ultrasonic detection device and a target object, and wherein, responsive to calculating the detection distance, the processor records a stored distance with the detection distance.

13. The ultrasonic detection device of claim 12, wherein, responsive to the analysis indicating that the first external signal has a signal characteristic indicative of the interference source separate from the ultrasonic detection device, the processor outputs the stored distance.

* * * * *